(12) United States Patent
Buerkle et al.

(10) Patent No.: US 9,875,416 B2
(45) Date of Patent: Jan. 23, 2018

(54) SITUATION ANALYSIS FOR A DRIVER ASSISTANCE SYSTEM

(71) Applicant: Robert Bosch GmbH, Stuttgart (DE)

(72) Inventors: Lutz Buerkle, Stuttgart (DE); Claudius Glaeser, Ditzingen (DE); Thomas Michalke, Weil der Stadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 87 days.

(21) Appl. No.: 15/032,534

(22) PCT Filed: Sep. 17, 2014

(86) PCT No.: PCT/EP2014/069770
§ 371 (c)(1),
(2) Date: Apr. 27, 2016

(87) PCT Pub. No.: WO2015/062781
PCT Pub. Date: May 7, 2015

(65) Prior Publication Data
US 2016/0253567 A1 Sep. 1, 2016

(30) Foreign Application Priority Data

Oct. 31, 2013 (DE) .................. 10 2013 222 190

(51) Int. Cl.
*G06K 9/00* (2006.01)
*B60W 50/16* (2012.01)
(Continued)

(52) U.S. Cl.
CPC ......... *G06K 9/00805* (2013.01); *B60W 40/04* (2013.01); *B60W 50/16* (2013.01);
(Continued)

(58) Field of Classification Search
CPC ... G06K 9/00805; G05D 1/021; B60W 50/16; B60W 30/09; G06T 3/4007; G06T 11/203; B62D 6/00
See application file for complete search history.

(56) References Cited

FOREIGN PATENT DOCUMENTS

KR 20130101913 A 9/2013
WO WO2009/064172 A1 5/2009

OTHER PUBLICATIONS

International Search Report for PCT/EP2014/069770, dated Jan. 5, 2015.

(Continued)

*Primary Examiner* — Tuan C To
(74) *Attorney, Agent, or Firm* — Norton Rose Fulbright US LLP; Gerard Messina

(57) ABSTRACT

A method for situation analysis for a driver assistance system on board a motor vehicle includes steps of providing a representation of the surroundings of the motor vehicle, the representation including a system of cells that are reversibly unambiguously associated with predetermined sections of the surroundings, scanning the surroundings of the motor vehicle with the aid of at least one sensor in order to detect an obstacle, and marking cells, based on the scan, in such a way that a cell that is associated with an obstacle-free section of the surroundings carries a first marker, and a cell that is associated with a section of the surroundings in which an obstacle has been detected carries a second marker. A morphological filter is subsequently used on the representation in order to provide cells, which are not accessible by the motor vehicle, with the second marker.

14 Claims, 7 Drawing Sheets

(51) Int. Cl.
*G05D 1/02* (2006.01)
*B60W 40/04* (2006.01)
(52) U.S. Cl.
CPC ......... *G05D 1/021* (2013.01); *G06K 9/00791* (2013.01); *B60W 2550/10* (2013.01)

(56) References Cited

OTHER PUBLICATIONS

Bertozzi, et al. "GOLD: A Parallel Real-Time Stereo Vision System for Generic Obstacle and Lane Detection", IEEE Transactions on Image Processing, vol. 7, No. 1 (1998), pp. 62-80. XP-000727376.
Jiang, et al. "Lane and Obstacle Detection Based on Fast Inverse Perspective Mapping Algorithm", Systems, Man,m and Cybernetics, IEEE (2000) International Conference in Nashville, TN, pp. 2969-2974.

SITUATION ANALYSIS FOR A DRIVER ASSISTANCE SYSTEM

FIELD

The present invention relates to a driver assistance system. In particular, the present invention relates to a situation analysis for the driver assistance system based on scans of the surroundings.

BACKGROUND INFORMATION

A driver assistance system on board a motor vehicle is configured for relieving a driver of the task of driving the motor vehicle. A signal may be output to the driver in order to control the movement of the motor vehicle in a predefined sense, or a direct intervention may be made into the motion control of the motor vehicle. For example, a parking assistant may assist the driver during parking in a parking space by scanning the surroundings of the motor vehicle and notifying the driver of obstacles. The parking assistant may also operate in a semiautomatic manner, in which, for example, a steering angle is automatically determined and set, while the speed is controlled by the driver. If the parking assistant is operated fully automatically, the parking operation may proceed completely without involvement of the driver.

Other examples of driver assistance systems include a braking assistant, a distance alert, a lane-keeping assistant, or traffic sign recognition. The driver assistance systems share the common feature that they process pieces of information that are scanned from the surroundings of the motor vehicle. To keep the scanning of the surroundings and the processing of the sensor signals preferably universal, it is customary to carry out the processing in so-called layers. Each layer makes use of the results of the next lower level. In the first level, the surroundings of the motor vehicle are scanned with the aid of one or multiple sensors. A surroundings model for the motor vehicle is created in a second layer, based on the sensor signals. A situation analysis takes place in a third layer. A function is determined in a fourth layer, and a signal is output to the driver or an intervention is made into the steering of the motor vehicle in a fifth layer.

A disadvantage of the conventional procedure is that the processing of data must be carried out on a low layer without knowing the exact requirements of the higher layers. For example, a parking assistant may require higher resolution of distances from surrounding obstacles, while a measuring rate is of secondary importance. In contrast, a braking assistant may require a high measuring rate, and distances from surrounding obstacles may possibly not have to be determined as accurately.

An object of the present invention is to provide an improved situation analysis in order to form an improved starting point for a downstream driver assistance function.

SUMMARY

A method according to the present invention for situation analysis for a driver assistance system on board a motor vehicle includes providing a representation of the surroundings of the motor vehicle, the representation including a system of cells that are reversibly unambiguously associated with predetermined sections of the surroundings, scanning the surroundings of the motor vehicle with the aid of at least one sensor in order to detect an obstacle, and marking cells based on the scan in such a way that a cell that is associated with an obstacle-free section of the surroundings carries a first marker, and a cell that is associated with a section of the surroundings in which an obstacle has been detected carries a second marker. A morphological filter is subsequently applied to the representation in order to provide cells, which are not accessible by the motor vehicle, with the second marker.

Improved suppression of measuring errors and summary of information may take place due to the use of the morphological filter. The result from the morphological filter may be an occupancy grid, which may be further used by different driver assistance systems.

In one specific embodiment, the morphological filter is configured for carrying out a convolution using morphological postprocessing. In another specific embodiment, the morphological filter is configured for carrying out a morphological closing with the aid of a structural element, the structural element being determined based on an outline of the motor vehicle.

The exact knowledge of the outline of the motor vehicle may thus be used for processing the cells of the representation of the surroundings of the motor vehicle. In this way, the decision regarding whether or not a cell is accessible by the motor vehicle may be made with improved selectivity. The outline of the motor vehicle may be defined with any desired accuracy, depending on the task. In this way, processing speed may be increased at the expense of accuracy, and vice versa.

The structural element is preferably determined based on a vehicle degree of freedom which is predefined by the driver assistance system. The processing by the morphological filter may thus be easily controlled as a function of the requirements of the driver assistance system.

The vehicle degree of freedom includes at least one of the following: a maximum acceleration, a minimum curve radius, and a traffic regulation. In this way, various reasons for why the motor vehicle is not able to access a predetermined cell of the representation may be included in the processing by the morphological filter. The resulting preprocessing of the representation, which may be regarded as an occupancy grid, may relieve the downstream driver assistance system and thus contribute to saving of resources.

In one specific embodiment, different vehicle degrees of freedom are associated with different areas of the surroundings, for each area an associated structural element being determined, and the morphological filter being used in areas with the particular associated structural element. In this way, different areas which have different relevance for the driver assistance system may be treated differently. For example, processing of an area situated behind the motor vehicle in the travel direction may be carried out roughly or not at all, while an area situated directly ahead of the motor vehicle is treated with particular accuracy.

In one preferred specific embodiment, multiple morphological filters are used, and outputs of the morphological filters are combined with one another in such a way that only cells which carry the first marker in the outputs of all filters receive the first marker. For this purpose, the filters may be used in succession, in each case the output of one filter representing the input of the subsequent filter. Alternatively, parallel filtering may take place, whereby multiple filters accept the same representation as an input, and the two outputs are combined with one another, for example with the aid of a logical condition regarding the first marker. Sequential and parallel configurations of morphological filters are cascadable.

In one specific embodiment, a travel trajectory for the motor vehicle is determined, and the morphological filter is used based on the travel trajectory. In this way, accessibility may be determined in an improved manner for a cell situated at a fairly large distance from a cell that is associated with the motor vehicle. An early response by the driver assistance system to a situation at hand may thus be made possible. A movement trajectory of a moving obstacle in the surroundings may also be determined, the morphological filter being used based on the movement trajectory. Dynamic aspects of a moving obstacle may thus be taken into account. In particular, a collision with a moving obstacle may be determined earlier or more accurately.

In the two last-mentioned specific embodiments, the structural element may be determined as a function of the trajectory. For example, the structural element may be moved along the trajectory and optionally rotated as a function of a trajectory curvature.

In a continuation of the method, based on cells that are associated with the motor vehicle, an adjacent area may be determined in which all cells carry the second marker, a signal for controlling the movement of the motor vehicle being determined based on the area. The signal may include a visual, acoustic, or haptic output to a driver of the motor vehicle; in another specific embodiment, a direct intervention into the motion control of the motor vehicle may also take place, with the aid of an actuator. The actuator may in particular concern a speed control or a direction control of the motor vehicle.

In yet another enhancement of the method, prior to using the morphological filter, raytracing may take place which originates from a cell that is associated with the motor vehicle. Cells which are accessible in a direct line from the motor vehicle without obstacles are provided with the first marker, and cells which are situated behind an obstacle from the standpoint of the motor vehicle are provided with the second marker. A starting basis for using the morphological filter may thus be easily and efficiently established.

A computer program product according to the present invention includes program code for carrying out the described method when the computer program product runs on a processing device or is stored on a computer-readable data carrier.

A device according to the present invention for situation analysis for a driver assistance system on board a motor vehicle includes a memory for storing a representation of the surroundings of the motor vehicle, the representation including a system of cells that are reversibly unambiguously associated with predetermined sections of the surroundings, in addition to an interface for a sensor for scanning the surroundings of the motor vehicle in order to detect an obstacle, and a processing device for marking cells, based on the scan, in such a way that a cell that is associated with an obstacle-free section of the surroundings carries a first marker, and a cell that is associated with a section of the surroundings in which an obstacle has been detected carries a second marker. The processing device is configured for using a morphological filter on the representation in order to provide cells, which are not accessible by the motor vehicle, with the second marker.

The device may be used for providing an improved database for the driver assistance system. In one specific embodiment, the device may be included in the driver assistance system.

BRIEF DESCRIPTION OF THE DRAWINGS

The present invention is described below in greater detail with reference to the figures.

DETAILED DESCRIPTION OF EXAMPLE EMBODIMENTS

Figure 1:
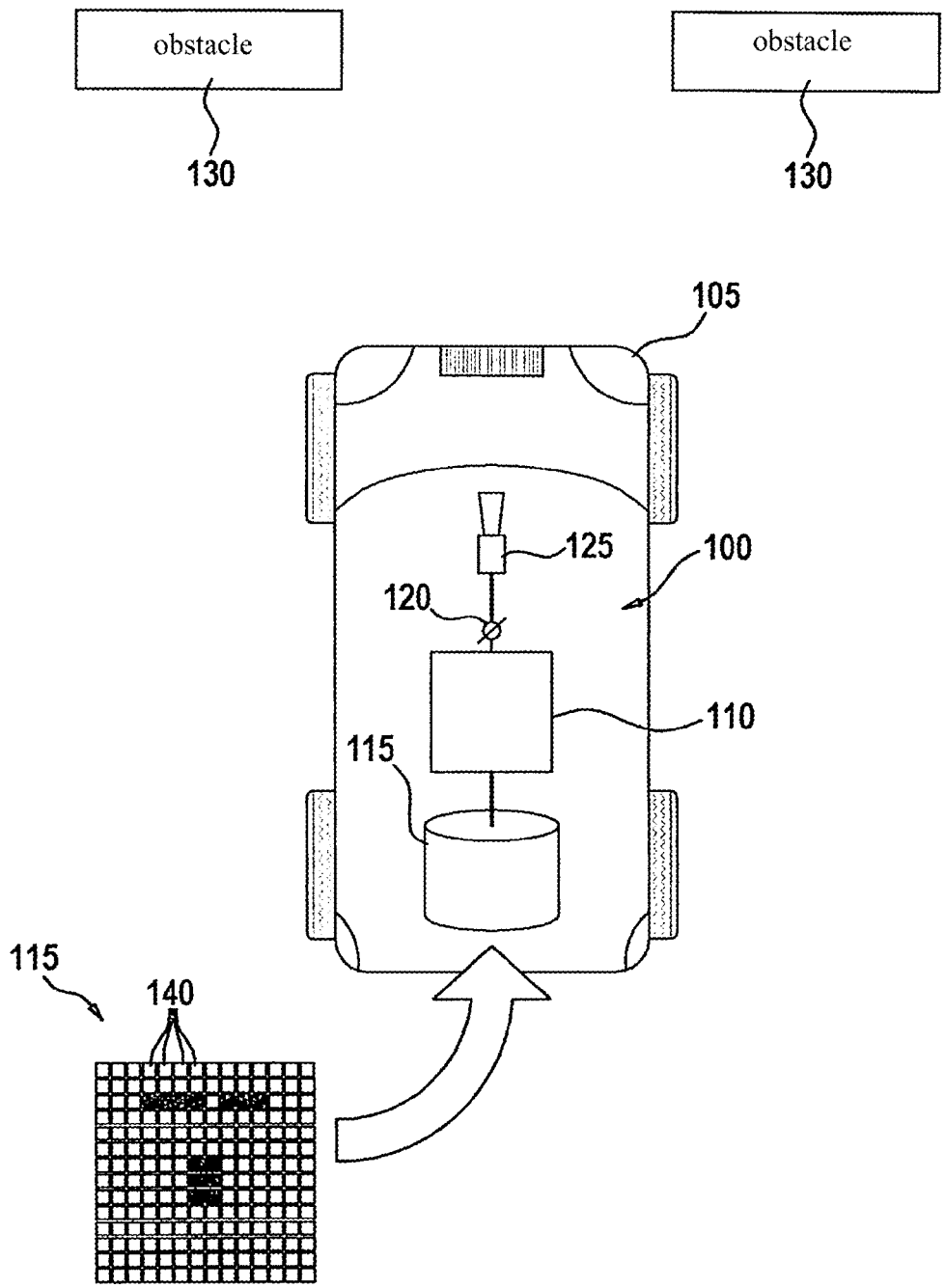
FIG. 1 shows a device for situation analysis for a driver assistance system on board a motor vehicle.

FIG. 1 shows a device 100 for situation analysis for a driver assistance system on board a motor vehicle 105. Device 100 includes a processing device 110, a memory 115, and an interface 120. Interface 120 is configured for connection to a sensor 125, sensor 125 being suitable for scanning the surroundings of motor vehicle 105 in order to detect an obstacle 130. Sensor 125 may in particular include an optical sensor, a radar or LIDAR sensor, or a combination of multiple sensors. FIG. 1 illustrates two examples of obstacles 130 which must not be run over or into by motor vehicle 105. An obstacle 130 may include, for example, a lane divider line, another motor vehicle, a building, a person, or some other obstacle. Obstacle 130 may be movable or immovable in the surroundings.

Memory 115 is configured for storing a representation 135 of the surroundings of motor vehicle 105. A schematic representation 135 is illustrated in FIG. 1 by way of example. Representation 135 includes a system of cells 140, each cell 140 being reversibly unambiguously (bijectively) associated with a predetermined section of the surroundings. Preferably, and in the illustration in FIG. 1, the system of cells 140 is two-dimensional, so that proximity conditions of cells 140 reflect corresponding proximity conditions of associated sections.

Approximately in the middle of representation 135, six cells 140 are illustrated which in the present case represent motor vehicle 105 by way of example. Each cell 140 may carry a marker, a first marker denoting a cell that is associated with an obstacle-free section of the surroundings, and a second marker marking a cell that is associated with a section of the surroundings in which an obstacle 130 has been detected. The two markers are mutually exclusive. In the illustration in FIG. 1, cells 140 with the first marker are light, and those with the second marker are dark. In one specific embodiment, each cell 140 of representation 135 may carry only either the first marker or the second marker. For example, representation 135 may be implemented as a bitmap.

Processing device 110 is configured for receiving the sensor data of sensor 125 via interface 120, and providing cells 140 of representation 135 with the first or the second marker as a function of the sensor information. If multiple sensors 125 are provided, the sensor signals may be combined. For example, it is possible for only those cells 140, which are associated with sections of the surroundings of motor vehicle 105 in which an obstacle 130 has been detected without the aid of sensors 125, to be provided with the first marker.

In addition, processing device 110 is configured for using a morphological filter on representation 135 after the assignment of markers to cells 140 in order to provide cells 140, which are not accessible by motor vehicle 105, with the second marker. In particular cells 140 which initially carry the first marker are provided with the second marker. Processing device 110 preferably includes a programmable microcomputer.

Figure 2:
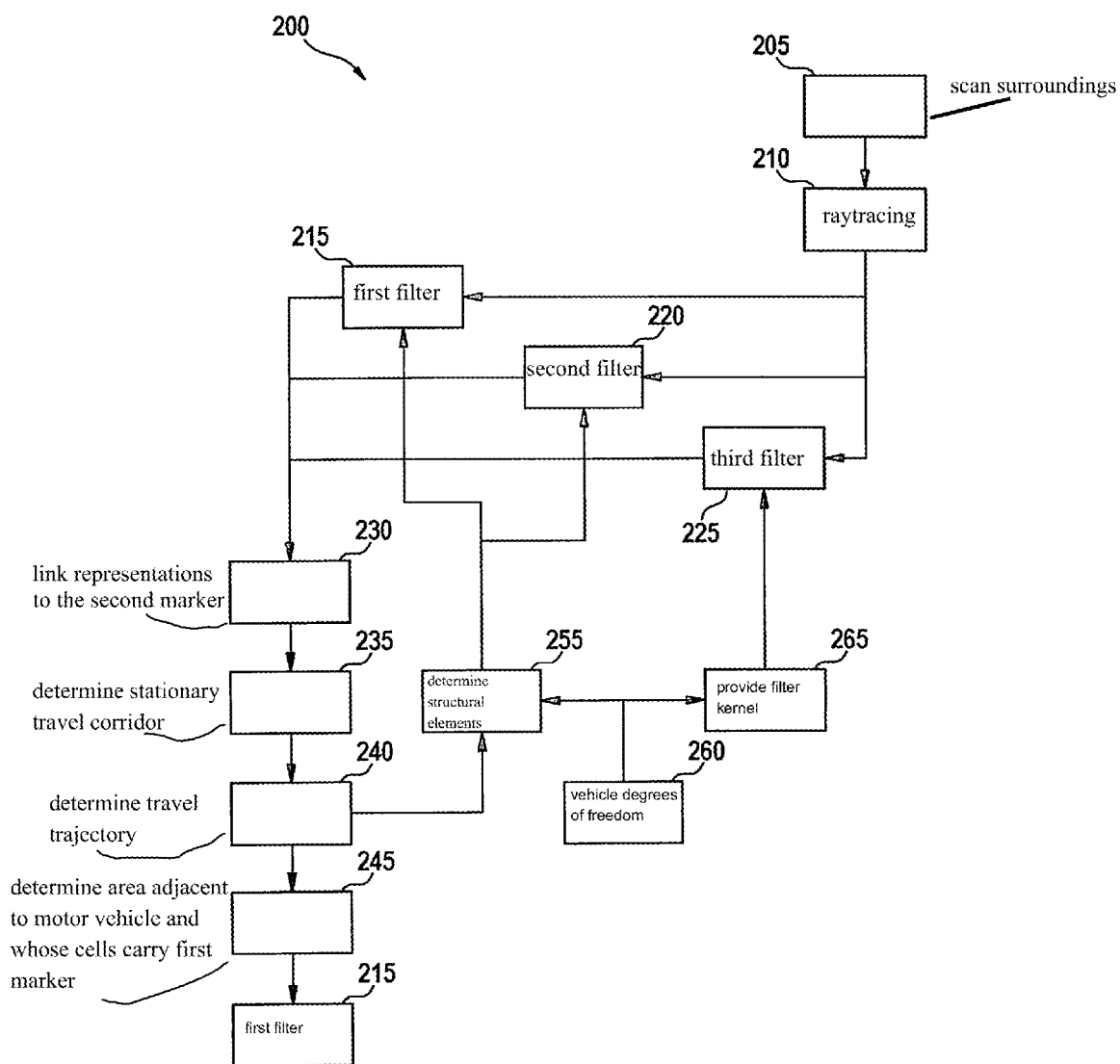
FIG. 2 shows a flow chart of a method for situation analysis for a driver assistance system on board the motor vehicle from FIG. 1.

FIG. 2 shows a flow chart of a method 200 for situation analysis for a driver assistance system on board motor vehicle 105 from FIG. 1. Method 200 is in particular configured for running on device 100, and in particular on processing device 110 from FIG. 1.

The surroundings of motor vehicle 105 are scanned in a step 205. At the same time, cells 140 of representation 135 are marked as a function of the scan which has taken place. This step 105 is not necessarily included in method 200. The scanning preferably takes place with the aid of the one or multiple sensors 125. Raytracing takes place in an optional step 210. Starting from cells 140 that are associated with motor vehicle 105, a line is traced across adjacent cells 140. If the line meets a cell 140 having the second marker, all cells 140 beneath the line which are situated farther away are provided with the second marker. It is thus modeled that an area which is obscured by an obstacle 130 likewise is not accessible by motor vehicle 105. Cells 140 situated beneath the line before the line has met a cell 140 having the second marker are provided with or retain the first marker. The direction of the line is subsequently changed, and the procedure is repeated until all directions or a predetermined, limited directional range have/has been swept over by the line.

Representation 135 is then used as the input for one or multiple morphological filters. The morphological filters may be used sequentially or in parallel. In the utilization in FIG. 2 as an example, three morphological filters are provided. A first filter is used in a step 215, and a second filter in parallel thereto is used in a step 220. Morphological closing takes place in each of steps 215 and 220 with the aid of a structural element, whose implementation is described in greater detail below. A convolution with morphological postprocessing as a third morphological filter is carried out in a step 225. The provision of a filter kernel for the convolution is likewise described in greater detail below.

The outputs of the morphological filters in steps 215, 220, and 225 are combined in a step 230, if necessary. In one specific embodiment, an independent representation 135 is created in each of steps 215, 220, 225, and the representations are linked to one another in step 230, based on the OR condition with regard to the second marker. The linkage may take place as an operation on bitmaps.

A stationary travel corridor of motor vehicle 105 is optionally determined in a step 235. This determination takes place based on the data which have been provided from step 230.

A travel trajectory of motor vehicle 105 is optionally determined in a step 240. A movement trajectory of one of obstacles 130 may also be optionally determined. Both trajectories may be determined based on previously determined sensor signals of sensor 125 or based on other information sources. An area which is adjacent to motor vehicle 105 and whose cells 140 all carry the first marker is determined in a step 245. This area corresponds to an open space around motor vehicle 105. The determined area may be subsequently output. Alternatively, a signal for controlling the movement of the motor vehicle, based on the determined open space, may be determined in a step 250 and output. The signal may be directed to a driver of motor vehicle 105, and may in particular be provided acoustically, visually, or haptically, or the motion control of motor vehicle 105 may be directly influenced with the aid of an actuator. For example, a steering angle may be changed, a brake may be actuated or enabled, or the drive torque of a drive engine may be changed. In another specific embodiment, the outputs already combined with one another in step 230 may be output to the morphological filters of steps 215, 220, and 225.

Based on the results of step 240, one or multiple morphological structural element(s) is/are determined in a step 255, on the basis of which a morphological closing may take place, in particular in steps 215 or 220. The determination of the structural elements in step 255 preferably takes place additionally based on one or multiple vehicle degrees of freedom of motor vehicle 105. The vehicle degrees of freedom may include in particular a vehicle extension in different directions, an outline, map data concerning traffic routes or traffic signs in the surroundings of motor vehicle 105, and similar constraints. The structural elements provided in step 255 reflect these constraints, so that the morphological closing in steps 215 and 220 provides those cells 140, which are not accessible by motor vehicle 105 based on the particular constraint, with the second marker.

The vehicle degrees of freedom in step 260 preferably also have an influence in a step 265, in which a filter kernel is provided for the convolution in step 225.

Method 200 is generally run through periodically. In one specific embodiment, representation 135 of the preceding run is resorted to in step 210 or 230. New and old information may thus be combined with one another.

The selection of the morphological filters of steps 215, 220, and 225 and the provision of the particular parameters for the morphological filters in steps 255 and 265 preferably take place as a function of a driver assistance system for which the situation analysis is to be carried out with the aid of method 200. If different driver assistance systems are provided on board motor vehicle 105, multiple instances of method 200 may be executed on the same sensor data of sensor 125. For a parking assistant, for example, a minimum curve radius of motor vehicle 105 may be taken into account in a first instance, while for a braking assistant, a second instance of method 200 instead weighs a maximum acceleration or deceleration of motor vehicle 105 more heavily.

Individual aspects of method 200 from FIG. 2 are explained in greater detail with reference to subsequent FIGS. 3 through 7.

Figure 3A:
FIG. 3 shows an overview of intermediate steps of the method from FIG. 2.

FIG. 3 shows an overview of intermediate steps of method 200 from FIG. 2. FIG. 3*a* shows a representation 135 of the surroundings of motor vehicle 105 after the scanning with the aid of sensor 125 in step 205. The illustrated situation shows motor vehicle 105 following a convoy of motor vehicles. Dark marked cells 140 carry the first marker, while light marked cells 140 carry the second marker. Medium-light marked cells 140 are filtered out for reasons not addressed here in greater detail. A white rectangle approximately in the middle of the illustration represents motor vehicle 105.

Figure 3B:
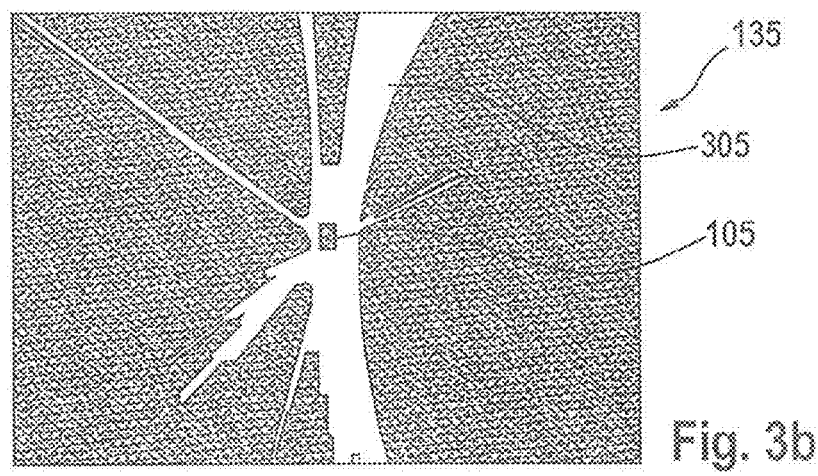

FIG. 3*b* shows representation 135 after the raytracing in step 210. Light cells carry the first marker, and dark cells carry the second marker. Contiguous light area 305 represents an open space around motor vehicle 105. Motor vehicle 105 is depicted as a dark rectangle approximately in the middle of the illustration in FIG. 3b.

Figure 3C:
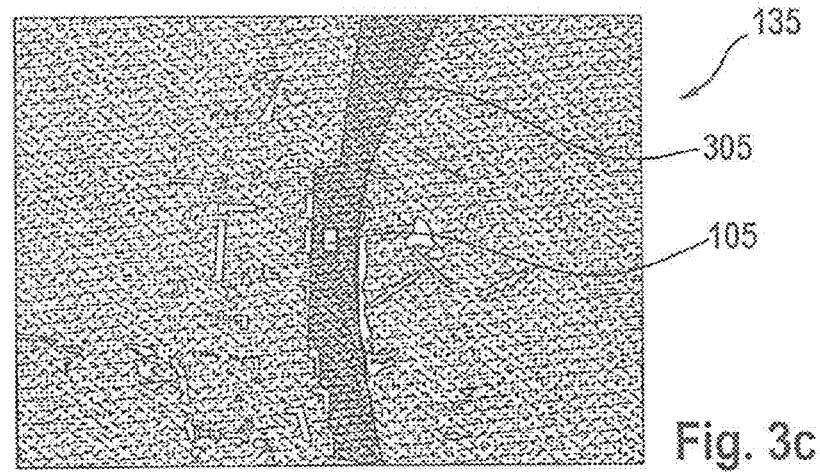

FIG. 3c shows representation 135 after running through at least one morphological filter of steps 215, 220, and 225. At least one morphological closing has been carried out with a structural element which typifies the dimensions of motor vehicle 105 on representation 135. Motor vehicle 105 is depicted by a light rectangle approximately in the middle of the illustration. Cells 140 with the first marker are dark, and cells with the second marker are light. Medium-light areas are not of further interest here, and may be regarded as light-colored. Open area 305 around motor vehicle 105 has been reduced in size, in that in particular those areas which motor vehicle 105 is too wide or too long to travel on have been removed from open area 305.

FIG. 4 shows an illustration of the mode of operation of a morphological filter, in particular for morphological closing. In FIG. 4a, representation 135 is illustrated by way of example after the surroundings of motor vehicle 105 have been scanned with the aid of sensor 125 in step 205. Light cells 140 carry the first marker, and dark cells 140 carry the second second marker.

Figure 4A:
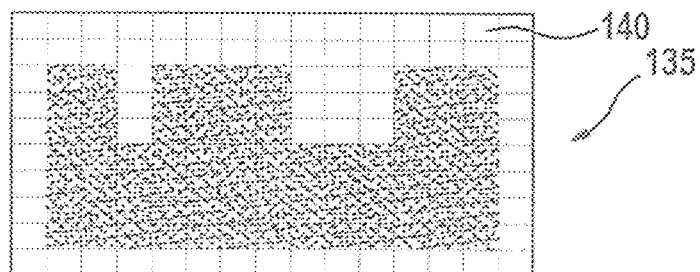
FIG. 4 shows an illustration of the mode of operation of a morphological filter.
Figure 4B:
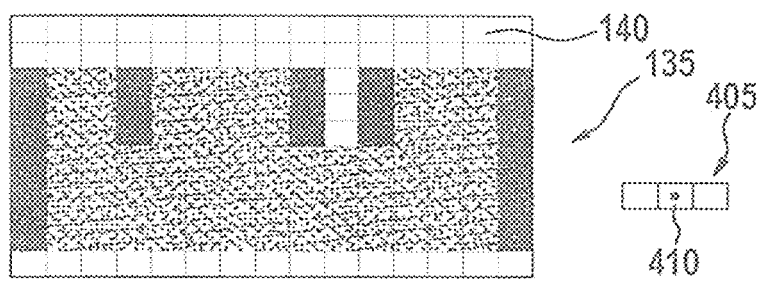

FIG. 4b shows representation 135 after the use of a morphological closing based on structural element 405 by way of example, illustrated on the right. Structural element 405 includes a number of fields which are in a predetermined configuration with respect to one another, one of the fields being depicted as an anchor 410. In the illustrated morphological dilatation, structural element 405 is placed on representation 135 in a stepwise manner in such a way that anchor 410 in each case comes to rest on a different cell. Every time each cell 140 is situated beneath one of the fields of structural element 405, it is provided with the second marker. As a result, the structure illustrated in FIG. 4a is inflated (dilated) in FIG. 4b.

Figure 4C:
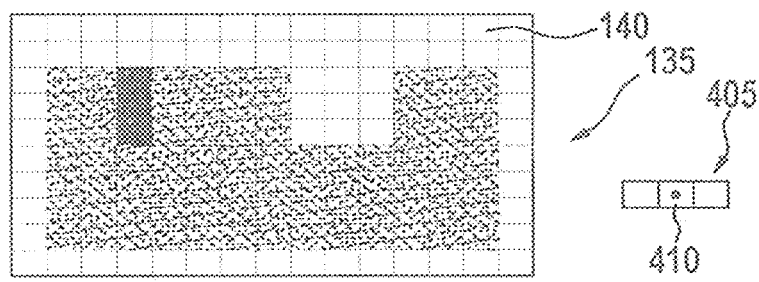

Erosion is the function of the morphological closing which is the inverse of dilatation, as illustrated in FIG. 4c. The same structural element 405 is assumed by way of example. The output of the dilatation from FIG. 4b is used as the input for the erosion. During the erosion, structural element 405 is once again led in a stepwise manner across representation 135, cell 145 situated beneath anchor 410 always receiving the second marker when all fields of structural element 405 are situated above cells which already carry the second marker. Otherwise, the cell situated beneath anchor 410 is provided with the first marker. As a result, the structure illustrated in FIG. 4b is removed (eroded) in FIG. 4c.

Figure 4D:
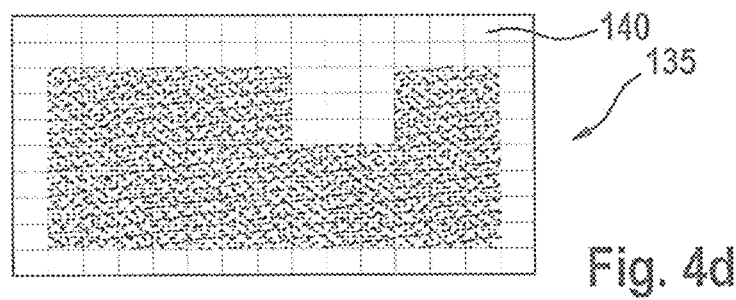

The result of the successive dilatation and erosion on representation 135 from FIG. 4a is apparent in FIG. 4d. The depression originally present at the top left in FIG. 4a has been closed, since it is narrower than structural element 405. In other respects, the markers of cells 140 have been maintained.

If the light area in FIG. 4a represents an area which is accessible by motor vehicle 105, and structural element 405 models the width of motor vehicle 105, a route which is too narrow for motor vehicle 105 to access is marked by the illustrated operation as non-accessible in representation 135.

FIG. 5 shows an illustration of the mode of operation of a morphological filter of filters 215, 220, or 225 of method 205 from FIG. 2. FIG. 5a shows a first morphological structural element 405 for modeling the length of motor vehicle 105, FIG. 5b shows a second morphological structural element 405 for modeling the width of motor vehicle 105, and FIG. 5c shows a third morphological structural element for modeling the outline of motor vehicle 105, including a right and a left outside mirror. Sizes and proportions of illustrated structural elements 405 are merely examples.

Figure 5A:
FIG. 5 shows an illustration of the mode of operation of a morphological filter for the motor vehicle from FIG. 1, in a first scenario.
Figure 5B:
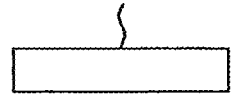
Figure 5C:
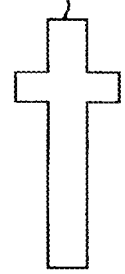
Figure 5D:
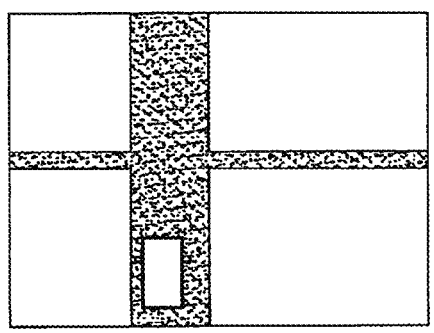

FIG. 5d shows a representation 135 after the scanning of the surroundings of motor vehicle 105 in step 205 of method 200. Dark cells 140 carry the first marker, and light cells 140 carry the second marker. Motor vehicle 105 together with its outside mirrors is illustrated in the lower area. Motor vehicle 105 is situated on a street from which narrow side streets branch off on the left and right, and which are too narrow for motor vehicle 105 to access. However, one of the outside mirrors of motor vehicle 105 may protrude into the side street if motor vehicle 105 is to be brought to the far right or the far left on the street, for example to allow an oncoming motor vehicle to pass.

Figure 5E:
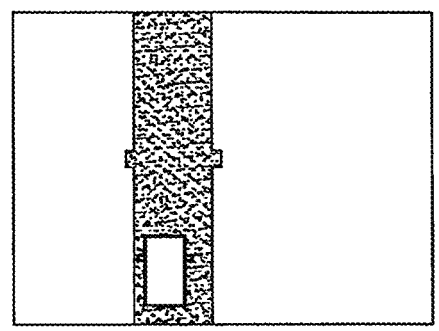

An application of structural element 405 from FIG. 5c on representation 135 from FIG. 5d provides representation 135 from FIG. 5e. Due to taking the outside mirrors into account in structural element 405, the side streets are eliminated only to the extent to which they cannot be used for accommodating the outside mirrors.

FIG. 6 shows an illustration of the mode of operation of a morphological filter from FIG. 1 in a second scenario. FIGS. 6a through 6d each illustrate representations 135 in which light cells 140 carry the first marker and dark cells 140 carry the second marker. A light rectangle represents motor vehicle 105. A travel trajectory 605 of motor vehicle 105 determined in step 240, for example, proceeds from motor vehicle 105. A driving ban 610 specifies that an area marked with a cross in the illustration in FIG. 6a must not be accessed.

Figure 6A:
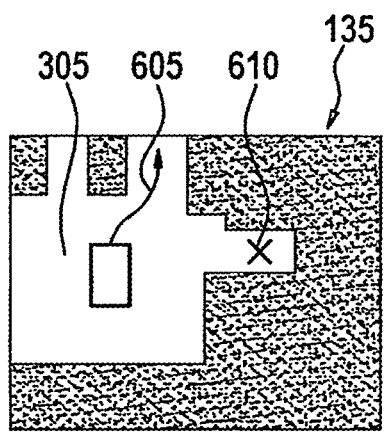
FIG. 6 shows an illustration of the mode of operation of a morphological filter from FIG. 1, in a second scenario.
Figure 6B:
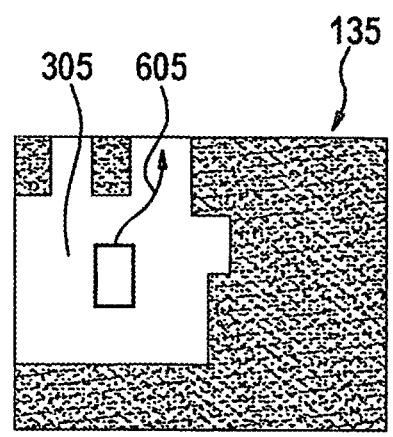
Figure 6C:
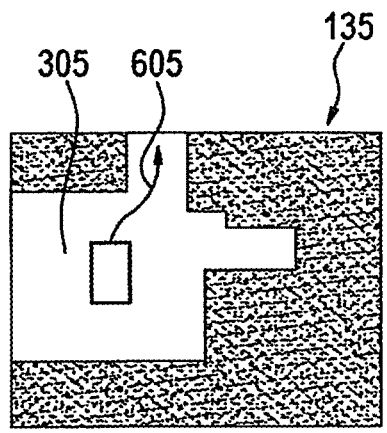

FIG. 6a shows the initial open space. FIG. 6b shows the result of a morphological closing based on structural element 405 from FIG. 5a, which represents the length of motor vehicle 105. Due to the operation, the area marked as banned has been removed from open area 305 around motor vehicle 105. FIG. 6c shows the result of a morphological closing of the situation illustrated in FIG. 6a, based on structural element 405 from FIG. 5b which models the width of motor vehicle 105. In the process, the route at the top left in FIG. 6a has been removed from the open area around motor vehicle 105, since motor vehicle 105 is too wide to access this route.

Figure 6D:
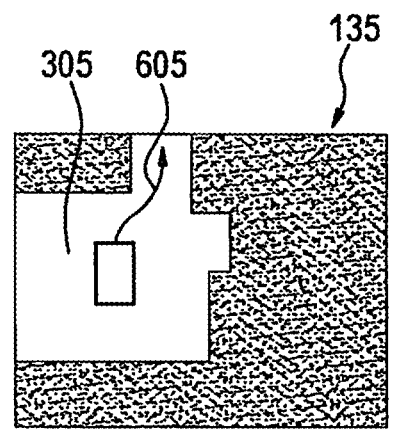

FIG. 6d shows the combination of the results of the two operations from FIGS. 6b and 6c. Open area 305 around the motor vehicle now meets the criteria for physical accessibility (with regard to the vehicle width) and legal accessibility (driving ban).

Figure 7:
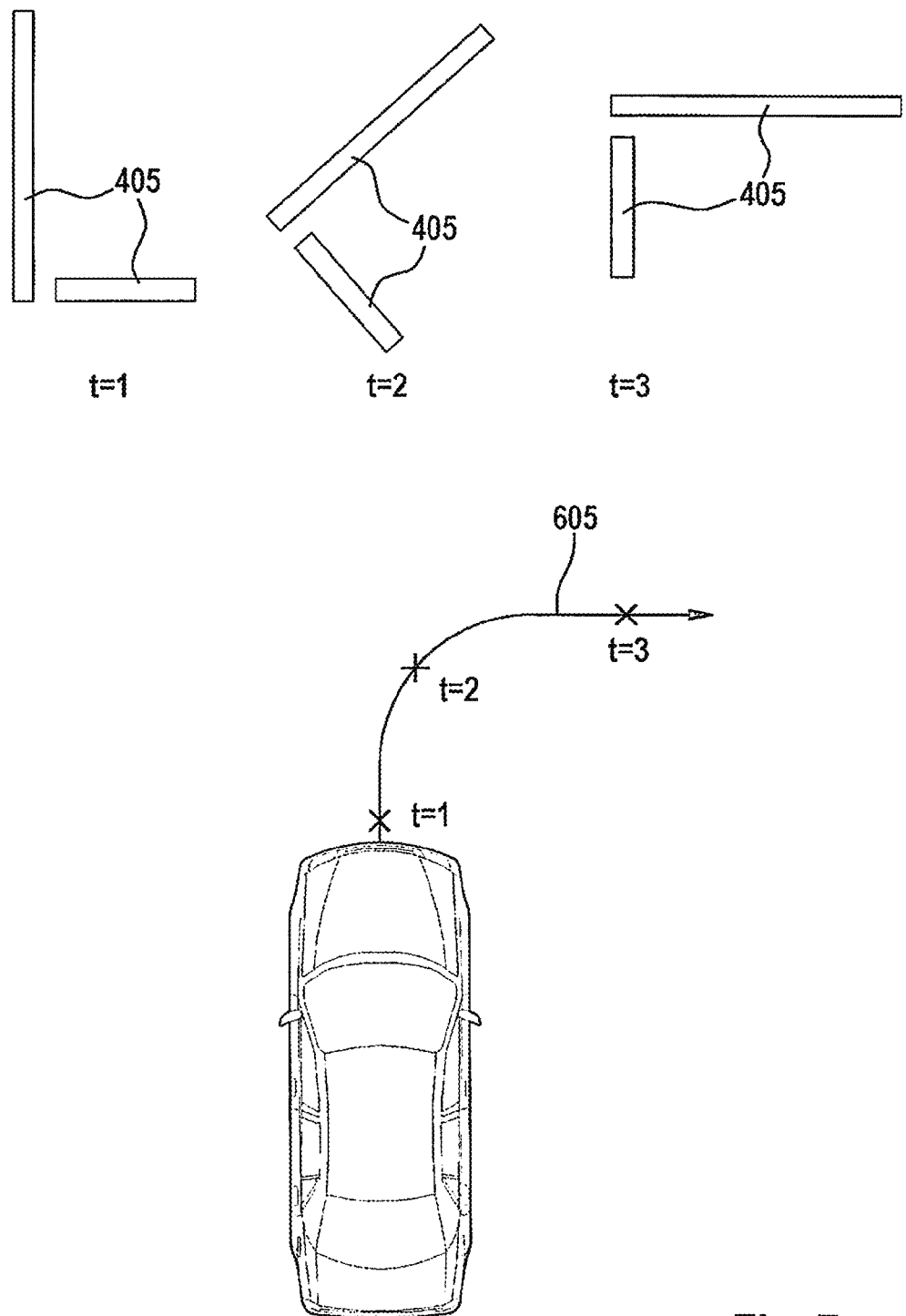
FIG. 7 shows illustrations of a variation of morphological structural elements as a function of a trajectory of the motor vehicle from FIG. 1.

FIG. 7 shows an illustration of a variation of morphological structural elements 405 as a function of trajectory 605 of motor vehicle 105. Trajectory 605 describes a 90-degree curve to the right. In the illustration in FIG. 7, motor vehicle 105 is oriented vertically at a first point in time t=1, is oriented diagonally upward to the right at a second point in time t=2, and is oriented horizontally to the right at a third point in time t=3.

Structural elements 405 which correspond to point in time t=1 relate to a length and a width of motor vehicle 105. Both structural elements 405 are rotated to the right, with respect to their illustrations at t=1, by 45 degrees at point in time t=2 and by 90 degrees at point in time t=3, corresponding to the position of motor vehicle 105. With regard to a representation 135 which is not oriented to motor vehicle 105, the orientation of the largest dimension of motor vehicle 105 changes by 90 degrees between points in time t=1 and t=3. As the result of taking trajectory 605 into account, improved morphological filtering with regard to the outline of motor vehicle 105 may take place, in that in particular the orientation of motor vehicle 105 about its vertical axis is taken into account in determining morphological structural elements 405.

Similarly, a movement trajectory of an obstacle 130 during future points in time may be taken into account. An outline of obstacle 130 may be determined, based on the movement trajectory, and open area 305 around motor vehicle 105 may be determined as a function of the displaced and optionally rotated outline of obstacle 130.

What is claimed is:

1. A method for situation analysis for a driver assistance system on board a motor vehicle, comprising:
    providing a representation of surroundings of the motor vehicle, the representation including a system of cells that are reversibly unambiguously associated with predetermined sections of the surroundings;
    scanning the surroundings of a motor vehicle with the aid of at least one sensor in order to detect an obstacle;
    marking cells, based on the scan, in such a way that
        a cell that is associated with an obstacle-free section of the surroundings carries a first marker, and
        a cell that is associated with a section of the surroundings in which an obstacle has been detected carries a second marker; and
    using a morphological filter on the representation to provide cells, which are not accessible by the motor vehicle, with the second marker.

2. The method as recited in claim 1, wherein the morphological filter is configured for a convolution using morphological postprocessing.

3. The method as recited in claim 1, wherein the morphological filter is configured for carrying out a morphological closing with the aid of a structural element, and the structural element is determined based on an outline of the motor vehicle.

4. The method as recited in claim 3, wherein the structural element is determined based on a vehicle degree of freedom which is predefined by the driver assistance system.

5. The method as recited in claim 4, wherein the vehicle degree of freedom includes at least one of the following: a maximum acceleration, a minimum curve radius, and a traffic regulation.

6. The method as recited in claim 5, wherein different vehicle degrees of freedom are associated with different areas of the surroundings, for each area an associated structural element being determined, and the morphological filter being modified in areas with the particular associated structural element.

7. The method as recited in claim 1, wherein multiple morphological filters are used, and outputs of the morphological filters are combined with one another in such a way that only cells which carry the first marker in the outputs of all filters receive the first marker.

8. The method as recited in claim 3, wherein a travel trajectory for the motor vehicle is determined, and the morphological filter is used based on the travel trajectory.

9. The method as recited in claim 1, wherein a movement trajectory of a moving obstacle in the surroundings is determined, and the morphological filter is used based on the movement trajectory.

10. The method as recited in claim 8, wherein the structural element is determined as a function of the trajectory.

11. The method as recited in claim 1, wherein, based on cells that are associated with the motor vehicle, an adjacent area is determined in which all cells carry the second marker, a signal for controlling the movement of the motor vehicle being determined based on the area.

12. The method as recited in claim 1, wherein prior to using the morphological filter, raytracing takes place which originates from a cell that is associated with the motor vehicle, and cells which are accessible in a direct line from the motor vehicle without obstacles are provided with the first marker, and cells which are situated behind an obstacle from the standpoint of the motor vehicle are provided with the second marker.

13. A computer program product which includes program code stored on a computer-readable storage medium, the program code for situation analysis for a driver assistance system on board a motor vehicle, the program code, when executed on a processing device, causing the following steps to be executed:
    providing a representation of surroundings of the motor vehicle, the representation including a system of cells that are reversibly unambiguously associated with predetermined sections of the surroundings;
    scanning the surroundings of a motor vehicle with the aid of at least one sensor in order to detect an obstacle;
    marking cells, based on the scan, in such a way that
        a cell that is associated with an obstacle-free section of the surroundings carries a first marker, and
        a cell that is associated with a section of the surroundings in which an obstacle has been detected carries a second marker; and
    using a morphological filter on the representation to provide cells, which are not accessible by the motor vehicle, with the second marker.

14. A device for situation analysis for a driver assistance system on board a motor vehicle, comprising:
    a memory that stores a representation of surroundings of the motor vehicle, the representation including a system of cells that are reversibly unambiguously associated with predetermined sections of the surroundings;
    an interface for a sensor for scanning the surroundings of the motor vehicle in order to detect an obstacle; and
    a processing device for marking cells, based on the scan, in such a way that:
        a cell that is associated with an obstacle-free section of the surroundings carries a first marker, and
        a cell that is associated with a section of the surroundings in which an obstacle has been detected carries a second marker;
    wherein the processing device is configured for using a morphological filter on the representation to provide cells, which are not accessible by the motor vehicle, with the second marker.

* * * * *